United States Patent
Turner

(10) Patent No.: US 6,523,458 B1
(45) Date of Patent: Feb. 25, 2003

(54) PORTABLE TOAST WARMER

(76) Inventor: Neil Turner, 17 Field Terrace Road, Newmarket (GB), CB8 0AD ( * ) Notice: Subject to any disclaimer, the term of this patent is extended or adjusted under 35 U.S.C. 154(b) by 0 days.

(21) Appl. No.: 10/193,894

(22) Filed: Jul. 11, 2002

(51) Int. Cl.[7] ............................................. A47J 37/08
(52) U.S. Cl. ....................... 99/332; 99/331; 99/342; 99/344; 99/385; 99/389; 99/483; 219/386; 219/521
(58) Field of Search .................... 99/327–333, 342–344, 99/385–389, 391–393, 483; 219/214, 385, 386, 519–521, 394, 428

(56) References Cited

U.S. PATENT DOCUMENTS

| | | | | |
|---|---|---|---|---|
| 1,955,867 A | * | 4/1934 | Wilkie et al. | 219/521 X |
| 2,592,203 A | * | 4/1952 | Snyder | 219/521 X |
| 2,719,479 A | * | 10/1955 | Rodwick | 99/391 X |
| 3,915,309 A | * | 10/1975 | Brazdo | 99/385 X |
| 4,748,308 A | * | 5/1988 | Drews | 99/391 X |
| 4,967,650 A | * | 11/1990 | Weigle | 99/374 X |
| 4,970,949 A | * | 11/1990 | Ferrara, Jr. et al. | 219/521 X |
| 5,299,492 A | * | 4/1994 | Carbon et al. | 219/519 X |
| 5,320,030 A | * | 6/1994 | Hubbard | 99/391 X |
| 5,379,685 A | * | 1/1995 | Krasznai | 99/391 X |
| 6,133,548 A | * | 10/2000 | Grover et al. | 219/386 |
| 6,205,911 B1 | * | 3/2001 | Ochoa | 99/331 |
| 6,279,466 B1 | * | 8/2001 | Gort-Barten | 99/389 |

* cited by examiner

Primary Examiner—Timothy F. Simone

(57) ABSTRACT

A portable toast warmer apparatus is described having a lower part detachably coupled to an upper part. The lower part of the portable toast warmer is connectable to an external electric power supply and is capable of transmitting electromagnetic energy to the upper part when the upper part is coupled to the lower part. The upper part of the portable toast warmer comprises a means for receiving the transmitted electromagnetic energy so that foodstuff slices may be warmed with the plurality of heaters mounted on the walls of the upper part when the upper part is coupled to the lower part. The upper part of the portable toast warmer also comprises a battery so that the toasted foodstuff slices may continue to be heated when the upper part is decoupled from the lower part so that the upper part containing the toasted foodstuff slices may be conveniently delivered to any desired location such as a dining room table.

20 Claims, 4 Drawing Sheets

PORTABLE TOAST WARMER

FIELD OF THE INVENTION

The present invention relates to toast warmers, more particularly to a portable toast warmer that comprises a plurality of power supplies in which an upper and lower part of the portable toast warmer can be detached from one another. The subsequently detached upper part of the toast warmer containing toasted foodstuff slices may be transported to any desired location well away from an external electric power supply while simultaneously supplying heat to maintain the temperature of the toasted foodstuff slices.

DESCRIPTION OF THE PRIOR ART

The prior art toast warmer or other similar device performs the unitary function of either warming or toasting one or more foodstuff slices, e.g., toasting a slice of bread. Examples of this include: the combination convertible toaster and warming oven disclosed by Wachtel in U.S. Pat. No. 3,073,342; the microwave oven toaster disclosed by Drews in U.S. Pat. No. 4,748,308; and the toasting apparatus described by Ochoa in U.S. Pat. No. 6,205,911B1. Typically, after the prior art toaster oven fulfills this unitary function, the foodstuff slice is then subsequently served in on a plate or on a rack. Examples of serving racks include the food retention rack disclosed by Brazdo in U.S. Pat. No. 3,915, 309 and the rack for holding slices of toasted bread and the like disclosed by Snyder in U.S. Pat. No. 2,592,203. As a result, the once warmed delicious toast can quickly become less palatable and less delicious when the toast cools off due to convective cooling processes. To avoid unwanted cooling, one prior art technique has been to stack the toast slices together onto a plate and cover these slices with a blanket to passively reduce the amount of cooling. Unfortunately, the prior art technique of insulating a pile of toast slices over a blanket often results in producing an undesirable condensation of moisture often results between stacked toasted slices. Therefore, a technique is needed which can actively supply heat to already toasted foodstuff slices so as to make consumption of these toasted foodstuff slices more enjoyable because they remain warm and dry when the consumer desires to eat them.

While all of the above-described devices fulfill their respective, particular objectives and requirements, the aforementioned patents do not describe a toast warmer having a detachable upper and lower part, in which each part is connected to a separate electrical source that would specifically match the user's particular individual needs of an apparatus which can be decoupled to deliver toasted foodstuff slices in an active heating unit. The above-described patents make no provision for this new function.

Therefore, a need exists for a new and improved portable toast warmer which is capable of conveniently and graciously serving toasted foodstuff slices in an actively headed compartment which can be placed on a dining area such as a dining table without an encumbering electrical cord connection. In this manner, the apparatus would allow the diner to enhance his dining pleasure by making available warmed toasted foodstuff slices when the diner is ready to consume the foodstuff slices. In this respect, the portable toast warmer according to the present invention substantially departs from the conventional concepts and designs of the prior art toast warmers and toast racks, and in doing so provides an apparatus primarily developed for the purpose of achieving a warming device for serving toasted foodstuff slices.

SUMMARY OF THE INVENTION

A portable toast warmer apparatus is described having a lower part detachably coupled to an upper part. The lower part of the portable toast warmer is connectable to an external electric power supply and is capable of transmitting electromagnetic energy to the upper part when the upper part is coupled to the lower part. The upper part of the portable toast warmer comprises a means for receiving the transmitted electromagnetic energy so that foodstuff slices may be kept warm with the plurality of heaters mounted on the walls of the upper part when the upper part is coupled to the lower part. The upper part of the portable toast warmer also comprises a battery so that toasted foodstuff slices can be heated when the upper part is decoupled from the lower part so that the upper part containing the toasted foodstuff slices may be conveniently delivered to any desired location such as a dining room table.

In view of the foregoing disadvantages inherent in the known type toast warmers now present in the prior art, the present invention provides an improved portable toast warmer, which will be described subsequently in great detail, is to provide a new and improved portable toast warmer which is not anticipated, rendered obvious, suggested, or even implied by the prior art, either alone or in any combination thereof.

To attain this, the present invention essentially comprises a lower part detachably coupled to an upper part. The lower part of the portable toast warmer is connectable to an external electric power supply and is capable of transmitting electromagnetic energy to the upper part when the upper part is coupled to the lower part. The upper part of the portable toast warmer comprises a means for receiving the transmitted electromagnetic energy so that foodstuff slices may be warmed with the plurality of heaters mounted on the walls of the upper part when the upper part is coupled to the lower part. The upper part of the portable toast warmer also comprises a battery so that the toasted foodstuff slices may be continued to be heated when the upper part is decoupled from the lower part so that the upper part containing the toasted foodstuff slices may be conveniently delivered to any desired location such as a dining room table.

There has thus been outlined, rather broadly, the more important features of the invention in order that the detailed description thereof that follows may be better understood, and in order that the present contribution of the art may be better appreciated.

The invention may also include a battery which is rechargeable and associated circuitry for charging the battery as well as indicating lights for allowing the user to be aware that the battery is either low in energy or is being charged. The invention may also have a temperature sensor for controlling the temperature during the warming cycle. The invention may also have a timing mechanism for controlling the heating cycle. The invention may have optional insulated handles attached to the upper part of the portable toast warmer so that the user is not likely to be injured by any hot surfaces when transporting the upper part. Finally the invention may also have optional insulated legs mounted on the upper part so as to minimize any heat damage that the upper part may cause when rested on a table top. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not decomponent from the spirit and scope of the present invention.

It is another object of the present invention to provide a new and improved portable toast warmer that may be easily and efficiently manufactured and marketed.

An even further object of the present invention is to provide a new and improved portable toast warmer that has a low cost of manufacture with regard to both materials and labor, and which accordingly is then susceptible of low prices of sale to the consuming public, thereby making such multipurpose storage unit and system economically available to the buying public.

Still another object of the present invention is to provide a new portable toast warmer that provides in the apparatuses and methods of the prior art some of the advantages thereof, while simultaneously overcoming some of the disadvantages normally associated therewith.

Even still another object of the present invention is to provide a portable toast warmer having detachable coupled lower part and an upper part. This makes it possible to transport toast within the upper part without unplugging the portable toast warmer.

Another object of the present invention is to provide a portable toast warmer having a detachable coupled lower part and an upper part, wherein the upper part comprises a battery and associated circuitry. This makes it possible to continue to toast or heat foodstuff slices mounted on the upper part when the upper part is not electrically connected to any external electric power supply. As a consequence, toasted foodstuff slices, such as toasted bread may be served in a container that continues to heat the toasted foodstuffs slices well away from any external electric power supply.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention or its application, which is measured by the claims, nor is it intended to be limiting as to the scope of the invention in any way.

These together with other objects of the invention, along with the various features of novelty that characterize the invention, are pointed out with particularity in the claims annexed to and forming a component of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same components throughout the various figures.

DETAILED DESCRIPTION OF THE PREFERRED EMBODIMENT

Figure 1:
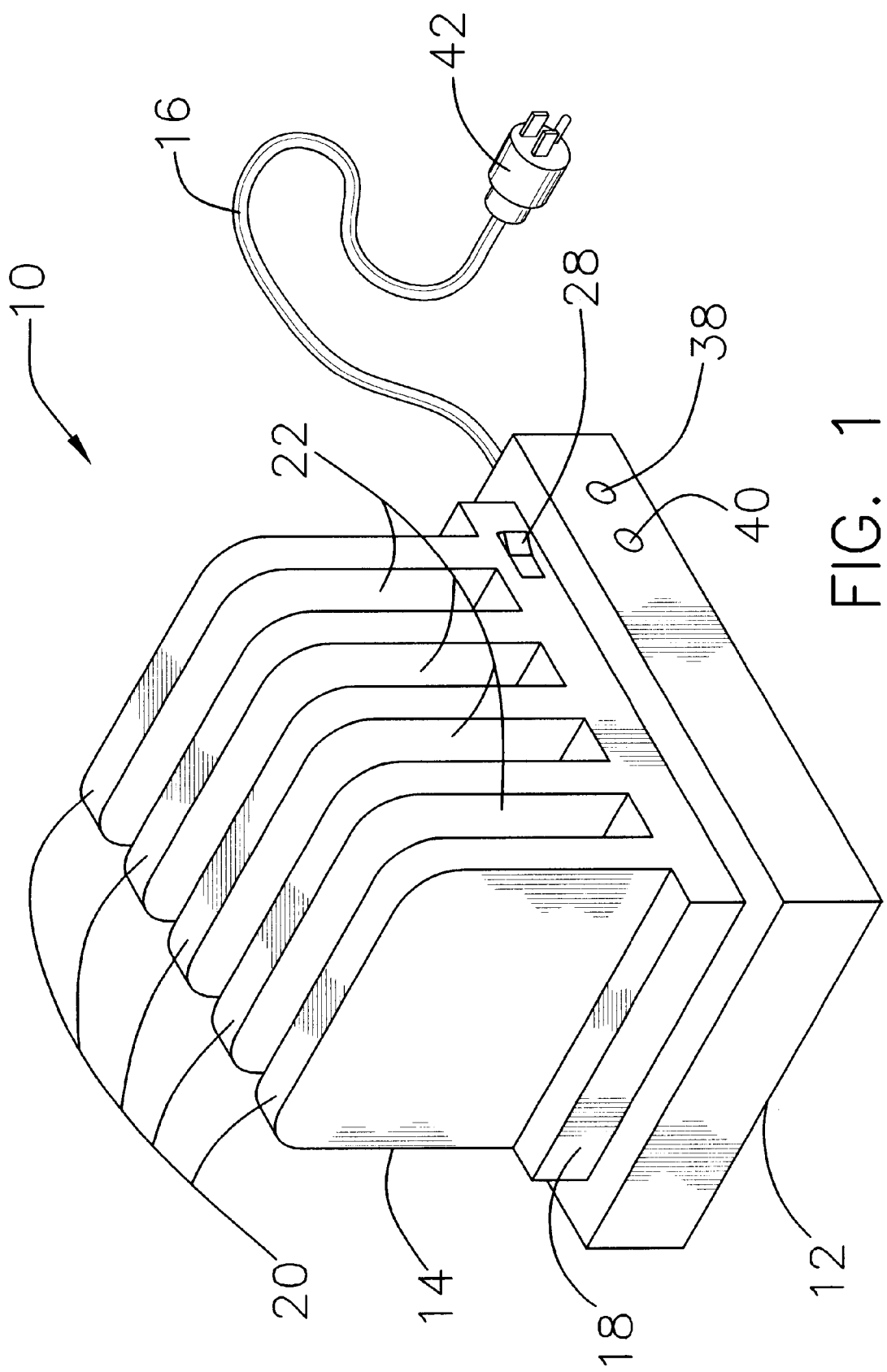
FIG. 1 is a perspective view of the preferred embodiment of the portable toast warmer constructed in accordance with the principles of the present invention.

Referring now to the drawings, and in particular FIG. 1 to 5 thereof, one preferred embodiment of the present invention is shown and generally designated by the reference numeral 10. A preferred embodiment of the portable toast warmer 10 comprises a lower part 12 and an upper part 14. The lower part 12 includes a means for detachably coupling together the lower part 12 and an upper part 14; and a first electric circuit. The means for detachably coupling together the lower part 12 and the upper part may be constructed of any number of different manners, such as nesting the upper part 14 into the lower part 12, and vice versa. The first electric circuit of the upper part 14 comprises a means for transmitting electromagnetic energy from the lower part 12 to the upper part 14; and an electrical power cable 16 attached to the lower part 12, the proximate end of the electrical power cable 16 operatively connected to the means of transmitting energy from the lower part 12 to the upper part 14, the electrical power cable 16 for inputting electrical power from a remote electrical power source. The upper part 14 includes a base 18, a plurality of walls 20 connected to the top of the base 18 and a second electric circuit. The base 18 of the upper part 14 has a top surface and a bottom. Each wall 20 is attached to the top surface of the base 18 at a substantially perpendicular alignment relative to the top surface of the base 18. Each wall is also aligned substantially parallel to all of the other walls 20 wherein the plurality of walls 20 forming a plurality of slots 22 between adjacent walls 20. Each slot 22 is capable of securely holding a foodstuff slice 36. The second electrical circuit in the lower part 14 comprises a battery 24, a means for receiving transmitted electromagnetic energy, a plurality of heating elements 26, and an electrical switching means 28. The battery 24 mounted on the base 18 of the upper part 14. The means for receiving transmitted electromagnetic energy of the upper part 14 is operatively connected to the battery 24. The plurality of heating elements 26 are mounted on the plurality of walls 20 and are operatively connected to the battery 24. The electrical switching means 28 is attached to the upper part 14 and operatively connected to the battery 24, to the means for receiving transmitted electromagnetic energy and to the plurality of heating elements 26. The electrical switching means 28 is for directing a portion of the received electromagnetic energy from the means for receiving transmitted electromagnetic energy to the plurality of heating elements 26 when the upper part 14 is coupled together with the lower part 12. Thereby the plurality of heating elements 26 are capable of warming any foodstuff slice 36 held in any of the plurality of slots 22 in the upper part 14 when the upper part 14 is coupled together with the lower part 12. The electrical switching means 28 is also for directing a secondary electrical current from the battery 24 to the plurality of heating elements 26 when the upper part 14 is physically detached from the lower part 12. Thereby the plurality of heating elements 26 are capable of heating any toasted foodstuff slice 36 held securely in any of the plurality of slots 22 in the upper part 14 when the upper part 14 is physically detached from the lower part 12.

The means for transmitting electromagnetic energy from the lower part 12 to the upper part 14 may optionally comprises a primary transformer winding operatively connected to the electrical power cable 16. In this optional configuration, the primary transformer winding is capable of being driven directly by the inputted electrical power delivered through the cable 16 from the remote electrical power source, and the primary transformer winding is capable of transmitting an oscillating electromagnetic field within the means for detachably coupling the lower part 12 and the upper part 14. The means for transmitting electromagnetic energy from the lower part 12 to the upper part 14 may also optionally comprise a voltage drop electrical circuit operatively coupled to the electrical power cord. This optional voltage drop electrical circuit is for converting the standard AC electrical power to a reduced voltage AC electrical power. The means for transmitting electromagnetic energy from the lower part 12 to the upper part 14 may also optionally comprise a first pair of electrical contacts 30 in electrical contact with a second pair of electrical contacts 34. In which the optional the first pair of electrical contacts 30 are operatively connected to the electrical power cable 16 and attached to the lower part 12. The optional second pair of electrical contacts 34 are attached to the base 18 of the upper part 14 in which the second pair of electrical contacts 34 are operatively connected to the battery 24, to the plurality of heating elements 26, and to the electrical switching means 28. In which the first pair of electrical contacts 30 are operatively connectable to the second pair of electrical contacts 34 when the lower part 12 and the upper part 14 are coupled together.

The means for receiving transmitted electromagnetic energy may optionally comprises a secondary transformer winding which is capable of being driven by a portion of the oscillating electromagnetic field transmitted from the primary transformer winding in which the secondary transformer winding is capable of producing a secondary AC source in the second electrical circuit for driving the plurality of heaters. As a consequence of using this configuration of a primary and secondary transformer there is no direct electrical connection established between the first and second electrical circuits when the upper part 14 and the lower part 12 are connected.

The means for receiving transmitted electromagnetic energy may also optionally comprises a second pair of electrical contacts 34 in electrical contact with a first pair of electrical contacts 30. The first pair of electrical contacts 30 are operatively connected to the electrical power cable 16 and attached to the lower part 12. The optional second pair of electrical contacts 34 are attached to the base 18 of the upper part 14 in which the second pair of electrical contacts 34 are operatively connected to the battery 24, to the plurality of heating elements 26, and to the electrical switching means 28. In which the first pair of electrical contacts 30 are operatively connectable to the second pair of electrical contacts 34 when the lower part 12 and the upper part 14 are coupled together. In which electromagnetic energy transmitted from the first pair of electrical contacts 30 is received by the second pair of electrical contacts 32.

The battery 24 may optionally be rechargeable. The second circuit may also optionally comprise a charging circuit for charging the rechargeable battery 24 with a portion of the second DC source converted by the optional rectifier. The battery 24 may be removably disposed in a battery compartment 32 in the upper part 14. Obtionally, the battery 24 may also be rechargeable and sealed within a battery compartment 32 within the upper part 14. In which the second electrical circuit would further comprises a charging circuit for charging the battery 24. It is preferrable that the battery 24 and all associated circuitry be encased so that the upper part 14 may be easily washable without compromising the integrity of the electrical circuitry.

A first indicating light 38 may optionally be incorporated in the first electric circuit. The first indicating light 38 is operatively connected to the first circuit as well as being operatively connectable to the second electric circuit when the lower part 12 is coupled to the upper part 14, the first indicating light 38 for indicating that the battery 24 is fully charged.

A second indicating light 40 may optionally be incorporated in the first electric circuit. The second indicating light 40 is operatively connected to the first circuit as well as being operatively connectable to the second electric circuit when the lower part 12 is coupled to the upper part 14, the second indicating light 40 for indicating that the battery 24 is being charged.

A rectifier may optionally be incorporated in the second electrical circuit for rectifying a portion of the secondary AC source in the second electrical circuit into a first DC source in the second electrical circuit for heating the heaters. The optional rectifier may also be configured so that it can be used to rectify a portion of the secondary AC source in the second electrical circuit into a second DC source. A rectifier may also be incorporated in the first circuit in which the rectifier is operatively connected to the cable 16 and to the first pair of electrical contacts 30. This optional rectifier in the first circuit is for rectifying the standard voltage AC electrical power to a first DC source.

A temperature sensor mounted onto the upper part 14 may be optionally incorporated into the second circuit. In which the optional temperature sensor is selected from the group consisting of a thermometer, a thermocouple, a thermister, and a resistor thermometric device.

The electrical switching means may optionally an on/off toggle operatively coupled to the electrical circuit.

A timing circuit may optionally be incorporated in the second electrical circuit for allowing a user to set the period of time when the electrical switching means 28 directs the portion of the received electromagnetic energy from the means for receiving transmitted electromagnetic energy to the plurality of heating elements 26 when the upper part 14 is physically contacted to the lower part 12, thereby allowing the user to adjust the warming of the foodstuff slice 36 slice. The second electrical circuit may also optionally comprises an optional alarm circuit for making an audible alarm when the set period of time is expired.

A pair of insulated handles attached to the base 18 of the upper part 14 of the portable toast warmer 10 may also be incorporated for allowing a user to lift the upper part 14 without being injured from the heat generated from the plurality of heating elements 26.

An optional set of legs may be attached to the bottom of the base 18 for allowing a user to rest the upper part 14 onto a table top without causing injury to the table top from the heat generated from the plurality of heating elements 26.

The plurality of walls 20 may be configured to adjustably connected to the top of the base 18 of the upper part 14 of the portable toast warmer 10 for allowing a user to adjust the distance between adjacent walls 20 to accommodate foodstuff slices 36 with different thicknesses.

Figure 2:
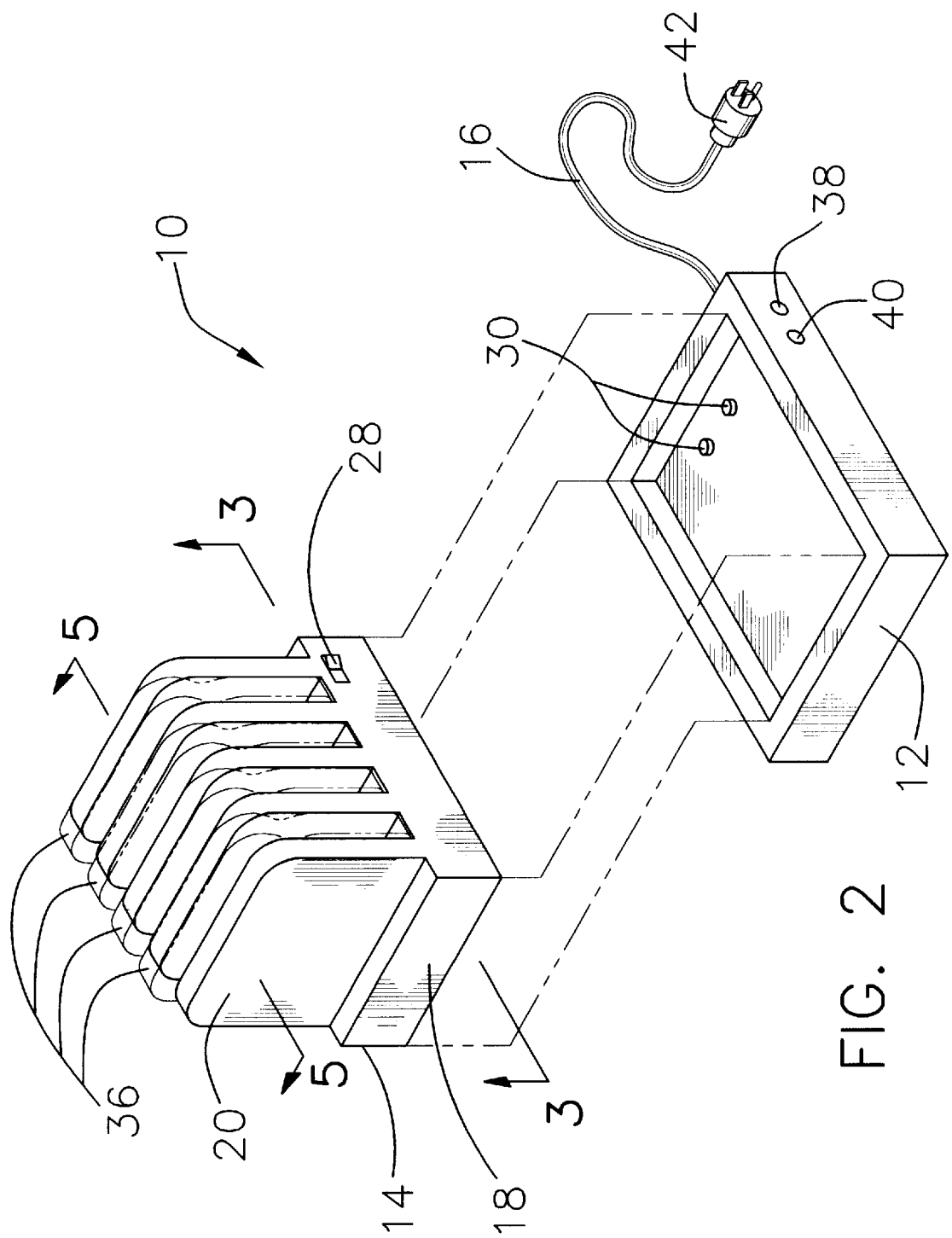
FIG. 2 is a perspective view of the portable toast warmer of the present invention showing the detach ability of the upper and lower parts.

Referring now to FIG. 1 and FIG. 2, a new and improved portable toast warmer unit 10 of the present invention is capable of warming foodstuff slices 36 when the upper part 14 is attached to the lower part 12. The new and improved portable toast warmer 10 of the present invention is also capable of being detachably broken apart into the lower part 12 and the upper part 14, in which the detached upper part 14 is capable of continually heating the toasted foodstuff slice 36. This makes it possible to conveniently transport the upper part 14 containing the toasted foodstuff slices 36 to a distant location, such as a dining table, so that the user may enjoy heated toasted foodstuff slices 36 at his convenience because the upper part 14 is capable of continually heating the toasted foodstuff slices 36. Even though FIG. 2 illustrates that the foodstuff slices 36 may be bread slices, the foodstuff slices 36 may be any type of edible material insertable into a standard toast warmer such as bread slices, bagel slices, pancakes, waffles, pizza slices and alike. Also illustrated in FIG. 2 is the optional first pair of electrical contacts 30 used as one of the preferred means of transmitting electromagnetic energy from the lower part 12 to the upper part 14. Not shown in any of the figures are the alternate transformer windings used to transmit and to receive electromagnetic energy between the lower part 12 to the upper part 14. An electrical cable 16 is shown attached to the lower part 12 which is operatively connected to the first circuit (not shown) in the lower part 12. The electrical cable 16 may be directly connected to the external power supply or may have a power plug 40 for conveniently powering the portable toast warmer 10 near any electrical socket. Also shown are a first indicating light 38 and a second indicating light 40 may optionally be incorporated in the first electric circuit attached to the lower part 12. The first indicating light 38 and the second indicating light 40 are operatively connected to the first circuit as well as being operatively connectable to the second electric circuit when the lower part 12 is coupled to the upper part 14. The first indicating light 38 for indicating that the battery 24 is fully charged. The second indicating light 40 for indicating that the battery 24 is being charged. Shown is one of the means for detachably coupling together the lower part 12 with the upper part 14 by having the upper part 14 nested within the lower part 12. An alternate means for detachably coupling together the lower part 12 with the upper part 14 may also have the upper part 14 nested over a portion of the lower part 12. Another alternate means for detachably coupling together the lower part 12 with the upper part 14 may also be the use of clips attached to either of the upper part 14 or the lower part for securing the two parts together. Also shown is an optional on/off toggle for enabling the first and second circuits.

Figure 3:
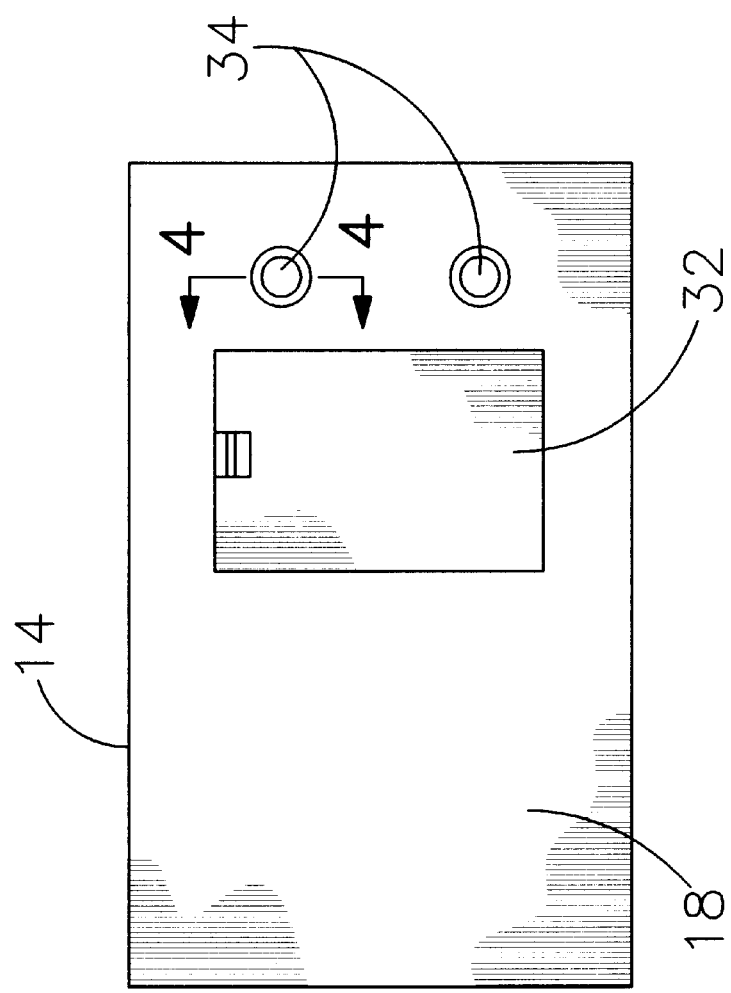
FIG. 3 is a bottom view of the upper part of the portable toast warmer of the present invention.

Referring now to FIG. 3 which is a depiction of a bottom view of the upper part 14 of the portable toast warmer 10 of the present invention showing an optional battery compartment 32 and showing the optional second pair of electrical contacts 30 used as a means for receiving transmitted electromagnetic energy from the lower part 12 of the portable toast warmer 10.

Figure 4:
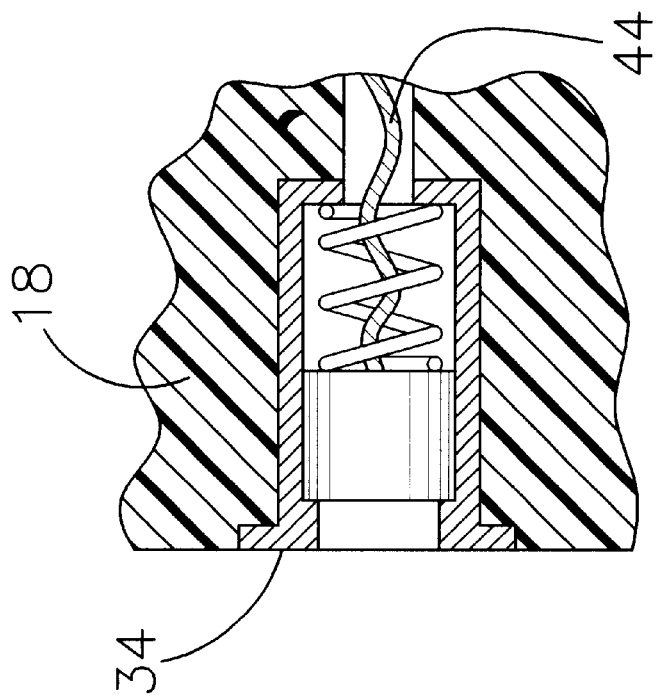
FIG. 4 is a cut away view of the upper part showing one of the second pair of electrical contacts of the portable toast warmer of the present invention.

Referring now to FIG. 4 which is a depiction of a cut away view of one of the second pair of electrical contacts 30 which is operatively connected to the second circuit within the upper unit 14 by an electrical wire 44.

Figure 5:
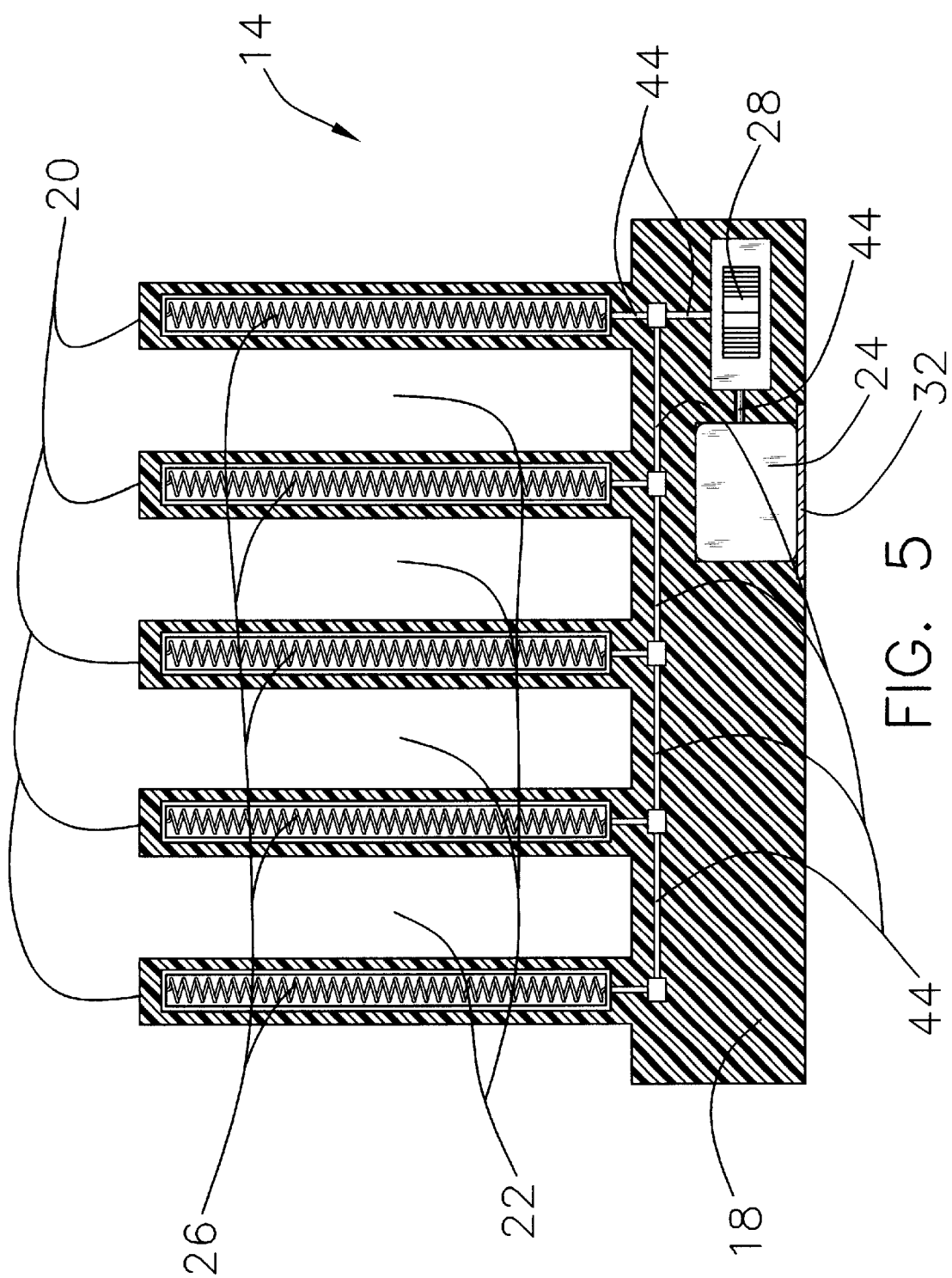
FIG. 5 is a cut away cross sectional view showing the plurality of heating elements mounted within the plurality of the walls in the upper part of the portable toast warmer.

Referring now to FIG. 5 which is a depiction of a cross sectional view of the upper part 14 of the portable toast warmer 10 showing one preferred embodiment of the plurality of heating elements 26 mounted within the plurality of walls 20 which allows for convenient cleaning because the plurality of heating elements 26 are sequestered within the plurality of walls 20. Also shown is a battery 24 mounted within a battery compartment 32 electrically connected to the switching means 28 having the optional on/off toggle. The switching means may comprise any number of commercially available circuit configurations which can be designed to automatically sense whether the lower part 12 is transmitting electromagnetic energy and subsequently designed to switch to using electrical power from the battery 24 to drive the plurality of heater elements 26 when transmitted electromagnetic energy is not sensed by the switching means. The battery 24 is operatively connected to the switching means 28, and operatively connected to the plurality of heating elements by an electric wire 44.

As to the manner of usage and operation of the present invention, the same should be apparent from the above description. Accordingly, no further discussion relating to the manner of usage and operation will be provided.

While a preferred embodiment of the portable toast warmer has been described in detail, it should be apparent that modifications and variations thereto are possible, all of which fall within the true spirit and scope of the invention. With respect to the above description then, it is to be realized that the optimum dimensional relationships for the components of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any sturdy material such as metal, thermally stable plastic With respect to the above description then, it is to be realized that the optimum dimensional relationships for the components of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A portable toast warmer comprising:
   a lower part including:
      a means for detachably coupling together said lower part and an upper part; and
      a first electric circuit comprising:
         a means for transmitting electromagnetic energy from said lower part to said upper part; and
         an electrical power cable attached to said lower part, the proximate end of said electrical power cable operatively connected to said means of transmitting energy from said lower part to said upper part, said electrical power cable for inputting electrical power from a remote electrical power source; and
   said upper part including:
      a base having a top surface and a bottom; and
      a plurality of walls connected to the top of said base, each wall is attached to the top surface of said base at a substantially perpendicular alignment relative to the top surface of said base and each wall is aligned substantially parallel to all of the other walls wherein said plurality of walls forming a plurality of slots between adjacent walls, whereby each slot is capable of holding a foodstuff slice;
      a second electrical circuit comprising:
         a battery mounted on said base;
         a means for receiving transmitted electromagnetic energy, said means of receiving transmitted electromagnetic energy operatively connected to said battery;
         a plurality of heating elements mounted on said plurality of walls, said plurality of heating elements operatively connected to said battery; and
         an electrical switching means operatively connected to said battery, to said means for receiving transmitted electromagnetic energy and to said plurality of heating elements,
            wherein said electrical switching means for directing a portion of the received electromagnetic energy from said means for receiving transmitted electromagnetic energy to said plurality of heating elements when said upper part is coupled together with said lower part, whereby said plurality of heating elements are capable of warming any foodstuff slice held in any of said plurality of slots in said upper part when said upper part is coupled together with said lower part, and
            wherein said electrical switching means for directing a secondary electrical current from said battery to said plurality of heating elements when said upper part is physically detached from said lower part, whereby said plurality of heating elements are capable of heating any toasted foodstuff slice held in any of said plurality of slots in said upper part when said upper part is physically detached from said lower part.

2. The portable toast warmer described in claim 1, wherein
   the inputted electrical power delivered through said cable from the remote electrical power source is standard voltage AC electrical power,
   said means for transmitting electromagnetic energy from said lower part to said upper part comprises a primary transformer winding operatively connected to said electrical power cable, said primary transformer winding is capable of being driven directly by the inputted electrical power delivered through said cable from the remote electrical power source, and said primary transformer winding is capable of transmitting an oscillating electromagnetic field within said means for detachably coupling said lower part and said upper part; and
   said means for receiving transmitted electromagnetic energy comprises a secondary transformer winding which is capable of being driven by a portion of the oscillating electromagnetic field transmitted from said primary transformer winding wherein said secondary transformer winding is capable of producing a secondary AC source in said second electrical circuit for driving said plurality of heaters
   whereby there is no direct electrical connection established between said first and second electrical circuits when said upper and lower parts are connected.

3. The portable toast warmer described in claim 2, wherein said battery is rechargeable; and wherein said second circuit furtherer comprises:
   a rectifier operatively connected to said secondary transformer, said rectifier for rectifying a portion of the secondary AC source in said second electrical circuit into a second DC source; and
   a charging circuit for charging said battery with a portion of said second DC source.

4. The portable toast warmer described in claim 3 wherein said first electric circuit further comprising:
   a first indicating light operatively connected to said first electric circuit and operatively connectable to said second electric circuit when said lower part is coupled to said upper part, said first indicating light for indicating that the battery is fully charged; and
   a second indicating light operatively connected to said first electric circuit and operatively connectable to said second electric circuit when said lower part is coupled to said upper part, said second indicating light for indicating that the battery is being charged.

5. The portable toast warmer described in claim 1, wherein
   the inputted electrical power delivered through said cable from the remote electrical power source is standard voltage AC electrical power,
   said means for transmitting electromagnetic energy from said lower part to said upper part comprises a primary transformer winding operatively connected to said electrical power cable, said primary transformer winding is capable of being driven directly by the inputted electrical power delivered through said cable from the remote electrical power source, and said primary transformer winding is capable of transmitting an oscillating electromagnetic field within said means for detachably coupling said lower part and said upper part; and
   said means for receiving transmitted electromagnetic energy comprises a secondary transformer winding which is capable of being driven by a portion of the oscillating electromagnetic field transmitted from said primary transformer winding wherein said secondary transformer winding is capable of producing a secondary AC source in said second electrical circuit;
   said second circuit further comprises a rectifier operatively connected to said secondary transformer, said rectifier for rectifying a portion of the secondary AC source in said second electrical circuit into a first DC source in said second electrical circuit for heating said heaters,
whereby there is no direct electrical connection established between said first and second electrical circuits when said upper and lower parts are connected.

6. The portable toast warmer described in claim 5, wherein said battery is rechargeable; and said second circuit further comprises:
a rectifier operatively connected to said secondary transformer, said rectifier for rectifying a portion of the secondary AC source in said second electrical circuit into a second DC source in said second electrical circuit; and
a charging circuit for charging said battery with a portion of said second DC source.

7. The portable toast warmer described in claim 1, wherein
the inputted electrical power delivered through said cable from the remote electrical power source is standard voltage AC electrical power, said means for transmitting electromagnetic energy from said lower part to said upper part comprises a primary transformer winding operatively connected to said electrical power cable, said primary transformer winding is capable of being driven directly by the inputted electrical power delivered through said cable from the remote electrical power source, and said primary transformer winding is capable of transmitting an oscillating electromagnetic field within said means for detachably coupling said lower part and said upper part; and
said means for receiving transmitted electromagnetic energy comprises:
a secondary transformer winding which is capable of being driven by a portion of the oscillating electromagnetic field transmitted from said primary transformer winding wherein said secondary transformer winding is capable of producing a secondary AC source in said second electrical circuit; and
a rectifier operatively connected to said secondary transformer, said rectifier for rectifying the secondary AC source in said second electrical circuit into a first DC source in said second electrical circuit, wherein the first DC source for driving said plurality of heating elements,
whereby there is no direct electrical connection established between said first and second electrical circuits when said upper and lower parts are connected.

8. The portable toast warmer described in claim 1, wherein
the inputted electrical power delivered through said cable from the remote electrical power source is standard voltage AC electrical power,
said means for transmitting electromagnetic energy from said lower part to said upper part comprises
a voltage drop electrical circuit operatively coupled to said electrical power cord, said voltage drop electrical circuit for converting the standard AC electrical power to a reduced voltage AC electrical power,
a primary transformer winding operatively connected said voltage drop electrical circuit, said primary transformer winding is capable of being driven directly by the reduced voltage AC electrical power delivered, and said primary transformer winding is capable of transmitting an oscillating electromagnetic field within said means for detachably coupling said lower part and said upper part; and
said means for receiving transmitted electromagnetic energy comprises:
a second electrical circuit having:
a secondary transformer winding which is capable of being driven by a portion of the oscillating electromagnetic field transmitted from said primary transformer winding wherein said secondary transformer winding is capable of producing a secondary AC source in said second electrical circuit; and
a rectifier operatively connected to said secondary transformer, said rectifier for rectifying the secondary AC source in said second electrical circuit into a first DC source in said second electrical circuit, wherein the first DC source for driving said plurality of heating elements,
whereby there is no direct electrical connection established between said first and second electrical circuits when said upper and lower parts are connected.

9. The portable toast warmer described in claim 1 wherein said means for transmitting electromagnetic energy from said lower part to said upper part comprises
a first pair of electrical contacts on said lower part, said first pair of electrical contacts are operatively connected to said electrical power cable; and
a second pair of electrical contacts on the base of said upper part, said second pair of electrical contacts operatively connected to said battery, to said plurality of heating elements, and to said electrical switching means,
wherein said first pair of electrical contacts are operatively connectable to said second pair of electrical contacts when said lower and upper parts are coupled together.

10. The portable toast warmer described in claim 9 wherein
the inputted electrical power delivered through said cable from the remote electrical power source is standard voltage AC electrical power, and
said first circuit further comprises a rectifier operatively connected to said cable and to said first pair of electrical contacts, said rectifier is for rectifying the standard voltage AC electrical power to a first DC source.

11. The portable toast warmer described in claim 9 wherein said battery is removably disposed in a battery compartment in said upper part.

12. The portable toast warmer described in claim 9 wherein said battery is rechargeable and is sealed within a battery part within said upper part, and wherein said second electrical circuit further comprises a charging circuit for charging said battery.

13. The portable toast warmer described in claim 1 wherein said second electrical circuit further comprises a temperature sensor mounted onto said upper part.

14. The portable toast warmer described in claim 13 wherein said temperature sensor is selected from the group consisting of a thermometer, a thermocouple, a thermister, and a resistor thermometric device.

15. The portable toast warmer described in claim 1 wherein said electrical switching means further comprises an on/off toggle operatively coupled to said second electrical circuit.

16. The portable toast warmer described in claim 1 wherein said second electrical circuit further comprise a timing circuit for allowing a user to set the period of time when said electrical switching means directs the portion of the received electromagnetic energy from said means for receiving transmitted electromagnetic energy to said plurality of heating elements when said upper part is physically contacted to said lower part, thereby allowing the user to adjust the warming of the foodstuff slice.

17. The portable toast warmer described in claim 1 wherein said second electrical circuit further comprises an alarm circuit for making an audible alarm when the set period of time is expired.

18. The portable toast warmer described in claim 1 wherein said upper part further comprises a pair of insulated handles attached to said base for allowing a user to lift said upper part without being injured from the heat generated from said plurality of heating elements.

19. A portable toast warmer described in claim 1 wherein said upper part further comprises a set of legs attached to the bottom of said base for allowing a user to rest the upper part onto a table top without causing injury to the table top from the heat generated from said plurality of heating elements.

20. The portable toast warmer described in claim 1 wherein said plurality of walls are adjustably connected to the top of said base, whereby allowing a user to adjust the distance between adjacent walls to accommodate foodstuff slices with different thicknesses.

* * * * *